2,920,935

METHOD OF MAKING ALUMINUM CONTAINING HYDRIDES

Albert E. Finholt, Northfield, Minn., assignor of one-fourth each to Marion L. Finholt, Herman I. Schlesinger and Herman I. Schlesinger, executor of the estate of Edna M. Schlesinger, deceased No Drawing. Application January 15, 1954
Serial No. 404,396

19 Claims. (Cl. 23—14)

This invention relates to a method of making aluminum-containing hydrides, and more particularly metal aluminum hydrides.

By the term metal aluminum hydrides, I mean a compound having the formula $M(AlH_4)_v$ wherein M is a metal other than aluminum, and $v$ is a number designating the valence of the metal M.

As disclosed in the Schlesinger et al. Patent No. 2,567,972, aluminum-containing hydrides are extremely useful as chemical reagents. They may be employed for replacing halogens or organic radicals by hydrogen in many inorganic compounds as well as for reducing a great variety of organic compounds including organic halides and compounds containing other reducible functional groups. These aluminum-containing hydrides have led to new methods, safer, more convenient, and more efficient than those hitherto known for producing hydrides of other elements or for producing derivatives of such hydrides. A particular advantage of these metal aluminum hydrides for the reduction of organic compounds is their specificity, as illustrated by the fact that functional groups of an organic compound, which also contains a carbon to carbon double bond, may often be reduced without affecting the double bond.

In the prior methods, metal aluminum hydrides were made by reacting an aluminum halide with a metal hydride, such as an alkali metal hydride or an alkaline earth metal hydride, employing an excess of metal hydride, and in the presence of a suitable solvent. This was accomplished in a one-step process. An example is the preparation of lithium aluminum hydride from lithium hydride and aluminum chloride.

Similar one-step methods have been employed in the making of sodium aluminum hydride and calcium aluminum hydride. For example, sodium aluminum hydride has been prepared by the action of sodium hydride on aluminum bromide using dimethyl ether as a solvent. However, this procedure has disadvantages. The relatively expensive aluminum bromide has to be used since results with aluminum chloride are unsatisfactory and the yields even with the bromide do not exceed 60 to 65%. In addition, the high volatility of the dimethyl ether necessitates the use of pressure equipment. Sodium aluminum hydride has also been prepared using aluminum chloride in the presence of solvents such as tetrahydrofuran, but the results have also been unsatisfactory because the reaction is erratic, sometimes giving small yields of the desired product and at other times, the desired product is not obtained; and because the products obtained are also low in purity.

I have discovered a new and improved method for making metal aluminum hydrides which not only overcomes the difficulties encountered in the older one-step methods for making these compounds, but which, in the manufacture of lithium aluminum hydride, permits the substitution of three moles of sodium hydride for three of the four moles of the more costly lithium hydride required per mole of lithium aluminum hydride to be produced.

The new method, in contrast to the prior one-step method, is a two-step process. In the first step, a quantity of a metal aluminum hydride is treated with an aluminum halide to form aluminum hydride and a non-aluminum metal halide, i.e., a metal halide other than an aluminum halide. In the second step, the resulting aluminum hydride, either admixed with the non-aluminum metal halide or after separation therefrom, is treated with a non-aluminum metal hydride to produce a metal aluminum hydride.

The following equations in which X is a halide illustrate the application of the new two-step process in making sodium aluminum hydride:

(1) 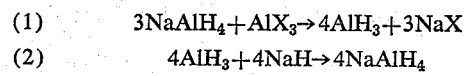
$$3NaAlH_4 + AlX_3 \rightarrow 4AlH_3 + 3NaX$$

(2)
$$4AlH_3 + 4NaH \rightarrow 4NaAlH_4$$

Equation 1 represents the first step and Equation 2 the second step of the new method. It is readily seen that from three moles of sodium aluminum hydride, four moles are obtained.

In carrying out the new method, a portion of the increased amount of the sodium aluminum hydride obtained may be retained for other purposes, and the remainder may be recycled for making still more sodium aluminum hydride. To begin the cycle, an initial amount of a metal aluminum hydride is required. This initial amount may consist of sodium aluminum hydride made by the prior one-step methods.

However, since the prior one-step methods are inconvenient and inefficient and since lithium aluminum hydride is easily prepared and commercially obtainable, lithium aluminum hydride may be used to start the cycle of operation as shown by the following equations:

(3) 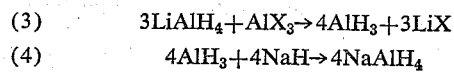
$$3LiAlH_4 + AlX_3 \rightarrow 4AlH_3 + 3LiX$$

(4)
$$4AlH_3 + 4NaH \rightarrow 4NaAlH_4$$

Once the cycle is started, further use of lithium aluminum hydride is unnecessary since thereafter the sodium aluminum hydride prepared from the lithium salt can be used to produce further amounts of sodium aluminum hydride.

It is important to note that when larger amounts of sodium aluminum hydride are made available by means of the new method, the sodium salt may be used advantageously to prepare the lithium salt. The prior methods of preparing the lithium salt consisted of treating lithium hydride with an aluminum halide in the presence of a suitable liquid medium as shown by the following equation:

(5)
$$4LiH + AlCl_3 \rightarrow LiAlH_4 + 3LiCl$$

It is seen from Equation 5 that four moles of lithium hydride are required per mole of lithium aluminum hydride obtainable. In this one-step method, it is preferred that an excess of lithium hydride be used so that the ratio of lithium hydride to lithium aluminum hydride is actually greater than 4:1. But if lithium aluminum hydride is made from sodium aluminum hydride by means of the new method only one mole of lithium hydride is required per mole of lithium aluminum hydride produced.

(6) 
$$3NaAlH_4 + AlX_3 \rightarrow 4AlH_3 + 3NaX$$

(7) 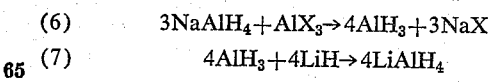
$$4AlH_3 + 4LiH \rightarrow 4LiAlH_4$$

It is important to note that the new method is not limited to the manufacture of sodium aluminum hydride, nor is it limited to the manufacture of alkali metal aluminum hydrides. It may be applied to the manufacture of alkaline earth metal aluminum hydrides. An example of the manufacture of an alkaline earth metal aluminum hydride from an alkali metal aluminum hydride is represented by the following equations:

(8) $\quad 3MAlH_4 + AlX_3 \rightarrow 4AlH_3 + 3MX$ (9) $\quad 4AlH_3 + 2M'H_2 \rightarrow 2M'(AlH_4)_2$ In Equations 8 and 9, M is an alkali metal and M' an alkaline earth metal.

The production of one alkaline earth metal aluminum hydride from another alkaline earth metal aluminum hydride is represented by the following equations:

(10) $\quad 3M'(AlH_4)_2 + 2AlX_3 \rightarrow 8AlH_3 + 3M'X_2$

(11) $\quad 8AlH_3 + 4M''H_2 \rightarrow 4M''(AlH_4)_2$ wherein M' represents one alkaline earth metal and M'' another alkaline earth metal.

In the first step of the new method in which a metal aluminum hydride is treated with an aluminum halide to produce an aluminum hydride and a non-aluminum metal halide, the reactants may first be mixed and the liquid medium then added. However, it is preferred first to dissolve the metal aluminum hydride in the liquid medium to be used and then add the aluminum halide to the solution. The aluminum halide may be added as such or dissolved in the liquid medium being used.

The liquid medium used in this first step should be one in which both reactants as well as the aluminum hydride are at least somewhat soluble, but in which the non-aluminum metal halide is substantially insoluble. Under these conditions, the desired reaction proceeds rapidly and results in the formation of a solution of aluminum hydride and the precipitating of the substantially insoluble non-aluminum metal halide.

For example, if sodium aluminum hydride (NaAlH$_4$) is to be used in the first step, either for making additional amounts of this compound or for making calcium aluminum hydride, tetrahydrofuran is a suitable liquid medium but other solvents such as tetrahydropyran may be used. If lithium aluminum hydride (LiAlH$_4$) is to be used to start the cycle of steps, diethyl ether may be employed in the first step.

The second step of the new method consists, as previously described, of the treatment of the aluminum hydride obtained in the first step with a hydride of the metal to be associated with the AlH$_4$ group in the desired end product. The liquid medium preferably to be used in this step is one in which both the aluminum hydride and the desired end product, i.e., a metal aluminum hydride, are appreciably soluble.

In many cases the liquid medium used for the second step will be the same as that used for the first step, as for example in the making of more sodium aluminum hydride (NaAlH$_4$) from an initial quantity thereof or in making calcium aluminum hydride [Ca(AlH$_4$)$_2$] from sodium aluminum hydride (NaAlH$_4$). In such cases it is not essential that the non-aluminum metal halide be separated from the AlH$_3$ solution obtained in the first step before proceeding to the second step. In such cases the non-aluminum metal hydride is added directly to the mixture of dissolved aluminum hydride and solid non-aluminum metal chloride. It is, however, often preferable to separate the solids obtained in the first step from the aluminum hydride solution before proceeding to the second step. This separation may be effected by filtration or centrifugation. Furthermore, if the same liquid medium is to be used for both steps, it is not necessary to evaporate the liquid medium from the product of the reaction of the first step, although such evaporation may be carried out.

If the liquid medium to be used in the second step is different from that used in the first step, it is usually desirable to remove the liquid medium from the reaction mixture obtained in the first step. It is not, however, necessary that all of the liquid medium used in the first step be removed, provided that the liquid medium used in the first step does not impair the effectiveness of the second step, for example, by rendering the desired metal aluminum hydride insoluble. Furthermore if the liquid used in the first step does not interfere with the second step, it is not necessary to remove any of the liquid medium used in the first step. It is, however, in general preferred to remove the first liquid wholly or partially. When different liquid media are used, just as in the case in which the same liquid is used for both steps, it is desirable but not essential to separate the non-aluminum metal halide precipitated in the first step from the solution of aluminum hydride before proceeding to the second step.

When diethyl ether cannot be used, suitable liquid media for the second step are tetrahydrofuran, tetrahydropyran, and glycol ethers. An example of a case in which different liquid media have been used for the two steps is the making of sodium aluminum hydride (NaAlH$_4$) from lithium aluminum hydride (LiAlH$_4$) in which the liquid medium for the first step might be diethyl ether and that for the second step might be tetrahydrofuran.

The preferred aluminum halide is aluminum chloride since this compound is commercially available and relatively inexpensive. However, other aluminum halides may be employed, such as aluminum bromide.

It is preferred that both steps in the new method be carried out in a relatively air and moisture-free atmosphere, such as may be achieved by displacing the air of the reaction vessel with dry nitrogen or another inert gas. Both steps have, however, been carried out successfully in air under normal humidity conditions. It is important also that the liquid medium employed be substantially moisture-free and that the alumium halide be substantially free from hydrogen halides.

One embodiment of the new two-step method is the preparation of sodium aluminum hydride (NaAlH$_4$) from lithium aluminum hydride (LiAlH$_4$). The sequence of reaction steps is:

(12) $\quad 3LiAlH_4 + AlCl_3 \rightarrow 4AlH_3 + 3LiCl$

(13) $\quad 4AlH_3 + 4NaH \rightarrow 4NaAlH_4$

In a typical example, 5.39 gms. (40.3 millimoles) of aluminum chloride was added to 4.87 gms. (122 millimoles) of lithium aluminum hydride in 159 gms. of diethyl ether in a reaction vessel under an atmosphere of dry nitrogen. There was an immediate reaction with the formation of a precipitate. After filtration, the soluble reaction product was found to contain aluminum hydride and no chloride while the precipitate was lithium chloride. Hydrogen analysis shows that all of the hydrogen of the lithium aluminum hydride remained in solution as aluminum hydride. The solvent was evaporated, and a portion of the solid containing 1.70 gms. (56.6 millimoles) of aluminum hydride, was dissolved in 60.0 gms. of tetrahydrofuran in a reaction vessel. 1.82 gms. (75.8 millimoles) of powdered sodium hydride was added to this solution under dry nitrogen. After 15 minutes of agitation, the mix became warm but quickly cooled to room temperature. After four hours of stirring, the solution was filtered and analyzed. Sodium and hydrogen analysis showed that at least a 98% yield of sodium aluminum hydride was obtained. Evaporation of the liquid solvent gave a 95% pure product of sodium aluminum hydride and the unreacted sodium hydride was .465 gm. (19.4 millimoles).

In the preceding example, the reaction was carried out at room temperature. It was found possible in other experiments to speed up the reaction between sodium hydride and aluminum hydride by using higher temperatures. In tetrahydrofuran at its boiling point, the two reagents reacted in less than 15 minutes.

An example of the preparation of sodium aluminum hydride, more useful industrially, is illustrated by the following reaction steps:

(14)   $3NaAlH_4 + AlCl_3 \rightarrow 4AlH_3 + 3NaCl$

(15)   $4NaH + 4AlH_3 \rightarrow 4NaAlH_4$

In a typical experimental run, a solution of 1.44 gms. of sodium aluminum hydride, dissolved in 52.0 gms. of tetrahydrofuran was placed in a reaction vessel. 1.19 gms. of aluminum chloride was added to this solution under an atmosphere of dry nitrogen. There was an immediate reaction with the formation of a white sodium chloride precipitate. After filtration, 3.0 gms. of powdered sodium hydride was added to the solution under dry nitrogen. After 15 minutes of agitation, the mix became warm and maintained its heat for about 15 minutes. After four hours of stirring, the solution was filtered and analyzed. Sodium and hydrogen analysis showed that at least a 98% yield of sodium aluminum hydride was obtained. Evaporation of the liquid solvent gave a 95% pure product of sodium aluminum hydride.

While it is desirable and convenient to remove the sodium chloride by filtration after running reaction (14) and before proceeding with reaction (15), it is not always necessary. The above experimental run was repeated, except omitting the filtration step after reaction (14) and the results were the same.

Instead of employing aluminum chloride in the first step, other aluminum halides may be employed. In a typical example, 1.62 gms. of aluminum bromide was added to a solution of 0.985 gm. of sodium aluminum hydride, dissolved in tetrahydrofuran. A white precipitate was formed. Analyses indicated that most of the sodium was precipitated as sodium bromide and no bromide remained in solution. The resulting aluminum hydride was then reacted with sodium hydride in the same manner described above. A high yield of sodium aluminum hydride was obtained.

A preparation of lithium aluminum hydride from sodium aluminum hydride was made according to the following reactions steps:

(16)   $3NaAlH_4 + AlCl_3 \rightarrow 4AlH_3 + 3NaCl$

(17)   $4AlH_3 + 4LiH \rightarrow 4LiAlH_4$

In an experimental run, 3.56 gms. of aluminum chloride were added to 4.34 gms. of sodium aluminum hydride dissolved in 184 gms. of tetrahydrofuran. There was an immediate reaction with some bubbling and the formation of a precipitate. After filtration, a portion of the tetrahydrofuran solution containing 1.8 gms. of aluminum hydride was placed in a reaction vessel. 0.91 gm. of powdered lithium hydride was then added to this solution under dry nitrogen. The solution was stirred and became warm almost immediately. After a few hours of stirring, the solution was filtered and the solvent was removed by evaporation. A product of over 86% pure lithium aluminum hydride was obtained.

A preparation of calcium aluminum hydride from lithium aluminum hydride was made according to the following reactions steps:

(18)   $3LiAlH_4 + AlCl_3 \rightarrow 4AlH_3 + 3LiCl$

(19)   $2CaH_2 + 4AlH_3 \rightarrow 2Ca(AlH_4)_2$

In a typical experimental run, 1.64 gms. of aluminum chloride was added to 1.40 gms. of lithium aluminum hydride in 60.0 gms. of diethyl ether in a reaction vessel under an atmosphere of dry nitrogen. There was an immediate reaction with the formation of a precipitate. After filtration, the solvent was evaporated to give a solid containing aluminum hydride. The latter was dissolved in 85.0 gms. of tetrahydrofuran in a reaction vessel. 4.0 gms. of calcium hydride was added to this solution under dry nitrogen. After four hours of stirring, the solution was filtered and analyzed. It was found that calcium aluminum hydride was formed.

In the new method, the only step in which an aluminum halide is used is in its reaction with a metal aluminum hydride, preferably in solution. Since this step is very rapid and since the amount of aluminum halide used is such that all or very nearly all of it is converted to aluminum hydride and a non-aluminum metal halide, no aluminum halide or only insignificant amounts thereof remain in solution. As a result, the liquid medium does not suffer deterioration by long contact with the aluminum halide and the latter cannot adversely affect the reaction of the non-aluminum metal hydride to be added for the second step. Thus, in the preparation of sodium aluminum hydride by the new method, yields and purities of from 95% to 98% have been achieved.

Another advantage of the new method is that the formation of a mixture of a metal hydride with the precipitated metal halide is avoided if the aluminum hydride solution obtained in the first step is separated from the precipitated metal halide. The disposal of such a mixture presents a safety hazard which the new two-step method eliminates.

Another advantage is that aluminum chloride may be successfully employed in the two-step process for making metal aluminum hydrides instead of the more expensive aluminum bromide.

In addition, when the new two-step method is used to prepare lithium aluminum hydride, 75% of the lithium hydride used can be replaced by an equivalent amount of the cheaper sodium hydride.

Still another advantage of the new two-step process is that many of the reactions where lithium aluminum hydride has been used can be carried out with sodium aluminum hydride, calcium aluminum hydride and the like.

The phrase "two-step" in the claims is not intended to exclude the use of any desired intermediate step (e.g., removing precipitated non-aluminum metal halide) which may or may not be used between the specified first and second steps.

Having described my invention in considerable detail, it is my intention that the invention be not limited by any of the details of the description unless otherwise specified, but rather be construed broadly within its spirit and scope, as set out in the accompanying claims.

I claim:

1. The two step method of preparing a metal aluminum hydride, which comprises, as the first step, reacting a metal aluminum hydride having the formula $M(AlH_4)_{vm}$ with an aluminum halide in the substantial absence of non-aluminum metal hydride to form aluminum hydride and a non-aluminum metal halide, and as a second step, after substantially all the aluminum halide is used up and in the substantial absence of aluminum halide, reacting the resulting aluminum hydride with a non-aluminum metal hydride having the formula $NH_{vn}$ to form a metal aluminum hydride having the formula $N(AlH_4)_{vn}$ wherein M and N are both metals other than aluminum and $vm$ and $vn$ are numbers designating the valence of metals M and N, respectively.

2. The two-step method of preparing a metal aluminum hydride which comprises, as the first step, reacting a metal aluminum hydride having the formula $M(AlH_4)_{vm}$ with an aluminum halide in the substantial absence of non-aluminum metal hydride to produce aluminum hydride and a non-aluminum metal halide, and as a second step, after substantially all the aluminum halide is used up and in the substantial absence of aluminum halide, reacting the resulting aluminum hydride with a non-aluminum metal hydride having the formula $MH_{vm}$ to produce a molar quantity of a metal aluminum hydride having the formula $M(AlH_4)_{vm}$ greater than that used initially, wherein M is a metal other than aluminum and $vm$ is a number designating the valence of the metal M.

3. The method of claim 2 wherein the reaction of the metal aluminum hydride having the formula $M(AlH_4)_{vm}$ with the aluminum halide takes place in a liquid medium in which the reactants and the resulting aluminum hydride are at least slightly soluble but the non-aluminum metal halide is substantially insoluble, and the reaction of the non-aluminum metal hydride having the formula $MH_{vm}$ with the aluminum hydride takes place in a liquid medium in which the aluminum hydride and the resulting metal aluminum hydride are appreciably soluble.

4. The method of claim 3 wherein M is calcium.

5. The method of claim 3 wherein M is sodium.

6. The two-step method of preparing a member of the class consisting of alkali metal and alkaline earth metal aluminum hydrides, which comprises, as the first step, reacting a metal aluminum hydride having the formula $M(AlH_4)_{vm}$ with an aluminum halide having the formula $AlX_3$ in the substantial absence of non-aluminum metal hydride to form aluminum hydride and a non-aluminum metal halide having the formula $MX_{vm}$; and as a second step, after substantially all the aluminum halide is used up and in the substantial absence of aluminum halide, reacting the aluminum hydride with a non-aluminum metal hydride having the formula $NH_{vn}$ to form a metal aluminum hydride having the formula $N(AlH_4)_{vn}$, wherein M and N are each a metal of the class consisting of alkali metals and alkaline earth metals, $vm$ and $vn$ are numbers designating the valence of metals M and N, respectively, and X is a halide.

7. The method of claim 6 wherein the reaction of the metal aluminum hydride having the formula $M(AlH_4)_{vm}$ with the aluminum halide having the formula $AlX_3$ takes place in a liquid medium in which the reactants and the resulting aluminum hydride are at least slightly soluble but the resulting non-aluminum metal halide having the formula $MX_{vm}$ is substantially insoluble, and the reaction of the non-aluminum metal hydride having the formula $NH_{vn}$ with the aluminum hydride takes place in a liquid medium in which the aluminum hydride and the resulting metal aluminum hydride having the formula $N(AlH_4)_{vn}$ are appreciably soluble.

8. The method of claim 7 wherein M and N are the same metals.

9. The method of claim 7 wherein M and N are different metals and $vm$ and $vn$ have the same value.

10. The method of claim 7 wherein M and N are different metals and $vm$ and $vn$ have different values.

11. The method of claim 7 wherein M and N are both sodium, X is a chloride, and $vm$ and $vn$ are both one.

12. The method of claim 7 wherein M is lithium, N is sodium, X is a chloride, and $vm$ and $vn$ are both one.

13. The method of claim 7 wherein M is sodium, N is lithium, X is a chloride, and $vm$ and $vn$ are both one.

14. The method of preparing a member of the class consisting of alkali metal and alkaline earth metal aluminum hydrides, which comprises the steps of reacting a metal aluminum hydride having the formula $M(AlH_4)_{vm}$ with an aluminum halide having the formula $AlX_3$ to form aluminum hydride and a non-aluminum metal halide having the formula $MX_{vm}$ in a liquid medium in which the reactants and the resulting aluminum hydride are at least slightly soluble but the non-aluminum metal halide ($MX_{vm}$) is substantially insoluble; separating the non-aluminum metal halide ($MX_{vm}$) from the solution of aluminum hydride; and then reacting in the substantial absence of aluminum halide the aluminum hydride with a non-aluminum metal hydride having the formula $NH_{vn}$ to form a metal aluminum hydride having the formula $N(AlH_4)_{vn}$, wherein M and N are each a member of the class consisting of alkali metals and alkaline earth metals, $vm$ and $vn$ are numbers designating the valence of metals M and N, respectively, and X is a halide.

15. The two-step method of preparing a metal aluminum hydride, which comprises, as the first step, reacting a metal aluminum hydride having the formula $M(AlH_4)_{vm}$ with an aluminum halide having the formula $AlX_3$ in the substantial absence of non-aluminum metal hydride to form aluminum hydride and a non-aluminum metal halide having the formula $MX_{vm}$ in the presence of a liquid medium in which the non-aluminum metal halide is substantially insoluble and the reactants and the resulting aluminum hydride are at least sufficiently soluble to avoid contamination of the solution by the precipitated non-aluminum metal halide, the quantity of aluminum halide employed being such that substantially all of the halogen is converted to a non-aluminum metal halide; and as a second step, after substantially all the aluminum halide is used up and in the substantial absence of aluminum halide, reacting the aluminum hydride with a non-aluminum metal hydride having the formula $NH_{vn}$ to form a metal aluminum hydride having the formula $N(AlH_4)_{vn}$ in the presence of a liquid medium in which the aluminum hydride and the metal aluminum hydride are appreciably soluble, wherein M and N are both metals other than aluminum, $vm$ and $vn$ are numbers designating the valence of metals M and N, respectively, and X is a halide.

16. The method of claim 15 wherein M and N are different metals and $vm$ and $vn$ have the same values.

17. The method of claim 15 wherein M and N are different metals and $vm$ and $vn$ have different values.

18. The method of preparing a metal aluminum hydride which comprises reacting sodium aluminum hydride in solution with an amount of aluminum halide such that substantially all of it reacts with the metal aluminum hydride to form aluminum hydride and sodium halide, removing the precipitated sodium halide and then reacting the aluminum hydride so formed with a non-aluminum metal hydride to produce an additional molar amount of metal aluminum hydride over that initially used in the production of the aluminum hydride.

19. The method of preparing a metal aluminum hydride which comprises reacting a metal aluminum hydride in solution with an amount of aluminum halide such that substantially all of it reacts with the metal aluminum hydride to form aluminum hydride and a non-aluminum metal halide, removing the precipitated non-aluminum metal halide, then reacting the aluminum hydride so formed with a non-aluminum metal hydride to produce an additional molar amount of metal aluminum hydride over that initially used and repeating the process with this additional quantity.

References Cited in the file of this patent

UNITED STATES PATENTS 2,576,311     Schlesinger et al.          Nov. 27, 1951

OTHER REFERENCES

Organic Reactions, vol. VI, by Roger Adams et al., copyright 1951, page 483.

Hurd: "Chemistry of the Hydrides," 1952, John Wiley and Sons, New York, page 96.

UNITED STATES PATENT OFFICE

CERTIFICATE OF CORRECTION

Patent No. 2,920,935                      January 12, 1960

Albert E. Finholt

It is hereby certified that error appears in the above numbered patent requiring correction and that the said Letters Patent should read as corrected below.

In the grant, lines 2, 3 and 4, for "assignor of one-fourth each to Marion L. Finholt, Herman I. Schlesinger and Herman I. Schlesinger, executor of the estate of Edna M. Schlesinger, deceased," read -- assignor of one-fourth to Marion L. Finholt, one-fourth to Hermann I. Schlesinger, and one-fourth to Edna M. Schlesinger; Hermann I. Schlesinger, Trustee under the will of said Edna M. Schlesinger, deceased, --; lines 13, 14 and 15, for "Albert E. Finholt, Marion L. Finholt, and Herman I. Schlesinger, their heirs or assigns, and Herman I. Schlesinger, as executor, his successors" read -- Albert E. Finholt, Marion L. Finholt, Hermann I. Schlesinger and Edna M. Schlesinger, their heirs or assigns; Hermann I. Schlesinger, Trustee under the will of said Edna M. Schlesinger, his successors --; in the heading to the printed sepcification, lines 4 to 7, for "assignor of one-fourth each to Marion L. Finholt, Herman I. Schlesinger and Herman I. Schlesinger, executor of the estate of Edna M. Schlesinger, deceased" read -- assignor of one-fourth to Marion L. Finholt, one-fourth to Hermann I. Schlesinger, and one-fourth to Edna M. Schlesinger; Hermann I. Schlesinger, Trustee under the will of said Edna M. Schlesinger, deceased --.

Signed and sealed this 23rd day of August 1960.

(SEAL)
Attest:

KARL H. AXLINE
Attesting Officer

ROBERT C. WATSON
Commissioner of Patents